United States Patent
Curran et al.

(10) Patent No.: US 10,677,928 B2
(45) Date of Patent: Jun. 9, 2020

(54) METHOD OF PROCESSING OFFSET CARRIER MODULATED RANGING SIGNALS

(71) Applicant: THE EUROPEAN UNION, represented by THE EUROPEAN COMMISSION, Brussels (BE)

(72) Inventors: James T. Curran, Ballinhassig (IE); Matteo Paonni, Gavirate (IT); Michele Bavaro, Pisa (IT); Joaquim Fortuny-Guasch, Taino (IT)

(73) Assignee: THE EUROPEAN UNION, REPRESENTED BY THE EUROPEAN COMMISSION, Brussels (BE)

( * ) Notice: Subject to any disclaimer, the term of this patent is extended or adjusted under 35 U.S.C. 154(b) by 0 days.

(21) Appl. No.: 15/737,153

(22) PCT Filed: Jun. 13, 2016

(86) PCT No.: PCT/EP2016/063518
§ 371 (c)(1),
(2) Date: Dec. 15, 2017

(87) PCT Pub. No.: WO2016/202746
PCT Pub. Date: Dec. 22, 2016

(65) Prior Publication Data
US 2018/0156922 A1   Jun. 7, 2018

(30) Foreign Application Priority Data
Jun. 16, 2015   (EP) .................................... 15172375

(51) Int. Cl.
*G01S 19/24*   (2010.01)
*G01S 19/30*   (2010.01)
(Continued)

(52) U.S. Cl.
CPC ............ *G01S 19/246* (2013.01); *G01S 19/02* (2013.01); *G01S 19/22* (2013.01); *G01S 19/25* (2013.01);
(Continued)

(58) Field of Classification Search
CPC ........ H04B 14/08; H04B 1/69; H04B 1/7075; H04B 1/7085; G01S 19/02; G01S 19/22;
(Continued)

(56) References Cited

U.S. PATENT DOCUMENTS

| | | |
|---|---|---|
| 2011/0309978 A1 | 12/2011 | Matsumoto |
| 2014/0119392 A1* | 5/2014 | Keegan .................. G01S 19/30 370/542 |

FOREIGN PATENT DOCUMENTS

| | | |
|---|---|---|
| EP | 1 681 773 A1 | 7/2006 |
| EP | 2 402 787 A1 | 1/2012 |

(Continued)

OTHER PUBLICATIONS

Extended European Search Report for corresponding priority Application No. 15172375.6, dated Dec. 21, 2015 (8 sheets).
(Continued)

*Primary Examiner* — George Eng
*Assistant Examiner* — Hung K Du
(74) *Attorney, Agent, or Firm* — Lewis Roca Rothgerber Christie LLP

(57) ABSTRACT

A method of processing offset carrier modulated, OCM, ranging signals in a radionavigation system including a plurality of satellite-borne transmitters and at least one ground-based receiver includes receiving a first radionavigation signal from at least one of the plurality of satellite-borne transmitters and down-converting and digitizing the first radionavigation signal to derive therefrom a first OCM signal SA, receiving a second signal SB synchronously
(Continued)

broadcast with the first OCM signal SA, the second signal SB having the same or substantially the same center frequency as the first OCM signal SA, coherently combining the first OCM signal SA with the second signal SB at the receiver to generate a combined signal SC, generating a combined correlation value YC corresponding to a correlation of the combined signal SC with a local replica of the first OCM signal SC, and deriving ranging information based on the combined correlation value YC.

20 Claims, 7 Drawing Sheets

(51) Int. Cl.

| | | |
|---|---|---|
| *G01S 19/25* | (2010.01) | |
| *G01S 19/02* | (2010.01) | |
| *G01S 19/22* | (2010.01) | |
| *H04B 1/7085* | (2011.01) | |
| *H04B 14/08* | (2006.01) | |

(52) U.S. Cl.
CPC ............ *G01S 19/30* (2013.01); *H04B 1/7085* (2013.01); *H04B 14/08* (2013.01)

(58) Field of Classification Search
CPC ........ G01S 19/246; G01S 19/25; G01S 19/30; H04L 27/00; H04L 27/2613
See application file for complete search history.

(56) References Cited

FOREIGN PATENT DOCUMENTS

| | | |
|---|---|---|
| JP | 2010-206256 A | 9/2010 |
| WO | WO 2010/098468 A1 | 9/2010 |

OTHER PUBLICATIONS

International Search Report and Written Opinion for corresponding International Application No. PCT/EP2016/063518, dated Sep. 16, 2016 (12 sheets).
Second Written Opinion for corresponding International Application No. PCT/EP2016/063518, dated May 15, 2017 (9 sheets).
International Preliminary Report on Patentability for corresponding International Application No. PCT/EP2016/063518, dated Sep. 28, 2017 (25 sheets).
Office Action for corresponding Japanese Application No. 2017-565110, dated Mar. 3, 2020 (8 sheets).

\* cited by examiner (a) BOCc(15,2.5)

(b) BOCc(15,2.5) and BOCs(1,1)

(a) BOCc(15,2.5)

(b) BOCc(15,2.5) and BOCs(1,1)

(a) BOCc(15,2.5)

(b) BOCc(15,2.5) and BOCs(1,1)

METHOD OF PROCESSING OFFSET CARRIER MODULATED RANGING SIGNALS

CROSS REFERENCE TO RELATED APPLICATIONS

This application is a National Phase Patent Application of and claims priority to and the benefit of International Patent Application Number PCT/EP2016/063518, filed on Jun. 13, 2016, which claims priority to EP Patent Application Number 15172375.6, filed on Jun. 16, 2015. The entire contents of both of which are incorporated herein by reference.

TECHNICAL FIELD

The present invention relates to satellite radio-navigation signals, and more particularly to a method and receiver for processing Offset Carrier Modulated (OCM) ranging signals.

BACKGROUND

Through the use of systems such as GPS, satellite navigation has become a critical element of society and economy. Global Navigation Satellite Systems (GNSS) involve the transmission of radionavigation signals to (typically, but not exclusively, ground-based) receivers where they are processed and used for ranging purposes, or to calculate a position, velocity, time (PVT) solution.

Many modern Global Navigation Satellite System (GNSS) signals broadcast composite Code Division Multiple Access (CDMA) signals which use an Offset Carrier Modulation (OCM). These signals incorporate varying numbers of baseband components and a range of sub-carriers. Examples include (i) Binary Phase-Shift Keyed (BPSK) baseband signals modulated by sinusoidal sub-carriers resulting in OCM signals, (ii) BPSK baseband signals modulated by square-wave sub-carriers, resulting in Binary Offset Carrier (BOC) signals, and (iii) Quadrature Phase-Shift Keyed (QPSK) signals using sinusoidal sub-carriers. In general, these signals exhibit a symmetric Power Spectrum Density (PSD) with little power located at the center frequency and two main lobes, located at either side of the signal center frequency, which contain the majority of the signal power.

This spectral shape, coupled with the autocorrelation properties of the baseband CDMA components, yields a signal which can provide high accuracy ranging. The autocorrelation function of such signals is typically steep and exhibits numerous zero-crossings. As the ranging accuracy provided by these signals is directly related to the signal autocorrelation function, these signals are often tuned to have a high slope near around the zero-offset point. However, this comes at a cost, which is generally manifest as difficulties experienced by the receiver in the initial signal acquisition phase, and when strong multipath conditions (involving reflected signals) prevail.

As many GNSS signals are broadcast from each satellite, it is not uncommon that the center-frequency of offset-carrier modulated signal coincides with a second signal which either has been modulated with either (a) no sub-carrier, or (b) a sub-carrier of a low frequency.

To demonstrate the challenges of processing offset-carrier modulated signals, an example OCM signal configuration will now be discussed, with reference to FIGS. 1 to 5 (PRIOR ART).

The particular signal chosen for illustration purposes is an OCM which uses a square-wave sub-carrier, typically termed a BOC modulation, with a primary code rate of (2.5×1.023) Mcps and a cosine-phased sub-carrier rate of (15×1.023) MHz. The composite modulation, denoted $BOC_c$ (15,2.5) has a normalized PSD and autocorrelation function depicted in FIGS. 1 and 2, respectively.

Specifically, the signal of interest (a down-converted and digitized version of the radionavigation signal received at the receiver's antenna) is denoted $s_A(t)$ which is modelled as follows:

$$s_A(t) = \sqrt{2P_A}\cos(2\pi F_A t + \theta_A)C_A(t)SC_A(t), \quad (1)$$

where $P_A$ denotes the nominal received power, $F_A$ is the nominal broadcast center frequency, CA (t) is the CDMA spreading sequence, and $SC_A$ (t) is the square-wave sub-carrier. Estimates of various signal parameters including, for example, $F_A$ and $\theta_A$, are generally extracted via correlation of the received signal and a local replica, the result, typically termed the correlator value and denoted $Y_A$ (f, τ, θ), is computed via:

$$Y_A(f, \tau, \theta) = \frac{1}{T_I}\int_t^{t+T_I} s_A(t)\exp(-j(2\pi f t + \theta))C_A(t+\tau)SC_A(t+\tau)\,dt, \quad (2)$$

where $T_I$, often termed the pre-detection integration period is generally of short duration, perhaps some milliseconds, and is generally chosen in accordance with the period of sCDMA spreading sequence, $C_A$.

One feature of this modulation that can be challenging for a receiver is the presence of multiple, so-called, side-peaks in the autocorrelation function, leading to acquisition ambiguity. When a receiver attempts to acquire such a signal, it typically implements a search across the code-delay τ, striving to detect the largest autocorrelation peak. Ideally this will correspond to the alignment between the received signal and the local replica signal. A problem is that, due the large relative magnitude of the adjacent peaks, both positive and negative, of the $BOC_c$(15, 2.5) autocorrelation function, the presence of thermal noise interference can lead a receiver to identify one of the adjacent local-maxima as the maximum value. In terms of receiver operation, this can correspond to a bias in the measured range and, thereby, degrade positioning accuracy.

As a demonstration of this particular problem, we consider that the signal has been acquired by detecting and tracking each of its components parts, the upper and lower side-lobes, separately. This corresponds to the individual or joint acquisition of one or both of the BPSK signals centered at $F_c \pm (15 \times 1.023)$ MHz. Given this coarse acquisition estimate, a receiver may begin to track the BPSK signals to refine the delay and frequency alignment and, subsequently, attempt a fine acquisition of the composite $BOC_C$(15, 2.5) signal. In doing so, the receiver may populate an acquisition search space, across the delay uncertainty. Typically this search will have a finite range and finite delay resolution, such that the uncertainty space occupies samples of the autocorrelation function, depicted in FIG. 2. As an example, we assume that the receiver may not be coherently tracking the signal, such that there may be a phase uncertainty and, therefore, might implement a non-coherent detection scheme.

The decision variable ($|Y_A|^2$) produced by examining the square magnitude of a complex correlation $Y_A$ between a received signal and a local replica, having perfect frequency synchronization, unaligned phase and a range of code-delays is presented in FIG. 3. When attempting to align the local replica signals with the received GNSS signals, the receiver may observe a range of code delays around the current best estimate. This range will depend on the uncertainty of the current code delay estimate.

As an example of this problem, FIG. 4 depicts the probability of choosing the correct code-delay when examining a range of correlator values, spaced at 1 meter intervals across a range extending ±30 meters for a selection of received C/N$_0$ values. While in the absence of thermal noise, selection of the appropriate code delay will be trivial, upon inspection of FIG. 4 it is clear that the performance may degrade rapidly with reduced signal quality. In particular, and as seen also in FIG. 3, it is noteworthy that the local maxima immediately adjacent to the (central) global maximum have relative magnitudes of almost 0.8.

Results are presented in FIG. 4 wherein it is clear that a receiver will experience significant difficulty in acquiring the appropriate code delay under weak signal conditions. Of course, the results presented here correspond only to the case where a receiver integrates over a period of $T_I=1$ ms. The performance can be improved by extending the integration period, however, this period is ultimately limited by the signal design and receiver operating conditions.

One further challenge experienced by receivers processing BOC signals is that of false-lock of the code tracking architecture: multiple stable lock points. Generally, a receiver will form some sort of discriminator to estimate misalignment spreading sequence, $C_A$, and secondary code, $SC_A$ between the received signal and the local replica. This is typically done by generating correlator values that are equally spaced, early and late, relative to the best estimate of the code delay. Differencing these early and late correlator values, respectively denoted $Y^E$ and $Y^L$, can generate the code-delay error estimate.

Depending on the receiver design, it may or may not coherently track the phase of the received signal. In cases where the received signal is tracked a coherent estimate can be made and if the signal phase is not tracked or if it is likely to be misaligned, then a non-coherent estimate can be made. For example, basic coherent and non-coherent delay estimates can be made via:

$$e_{coh} = A_{coh}(\Re\{Y^E\} - \Re\{Y^L\}) \quad (3)$$

$$e_{non\text{-}coh} = A_{non\text{-}coh}(|Y^E|^2 - |Y^L|^2) \quad (4)$$

where $A_{coh}$ and $A_{non\text{-}coh}$ are normalizing gains, generally a function of both the received signal strength, the signal modulation type and the relative spacing between the early and late correlator values; and $\Re\{x\}$ denotes the real part of a complex value x. Functions $e_{coh}$ and $e_{non\text{-}coh}$ generally produce an error estimate that is proportional to the true delay for a small range of delay values, centered around zero. A problem is that, outside this range, the error function can exhibit positive-sloped zero-crossings at which a code tracking scheme may experience a stable lock. These, so called, false-lock points can lead to biases in the measured range. The more complex the signal modulation, the greater the number of these false-lock points. Also, in the case of the BOC modulation, the non-coherent case will exhibit more false-lock points than the coherent case.

FIG. 5(a) depicts the coherent code error estimate, and FIG. 5(b) depicts the non-coherent code error estimate, of a BOCc(15, 2.5) signal given an early-to-late correlator spacing of 5 m. In the coherent case, the modulation results in twelve stable lock points which do not correspond to the true signal delay, although perhaps only ten of these are significant. More troubling is that in the non-coherent case this number increases to twenty-four and the range, over which the error estimate is proportional to the true error, shrinks by a factor of two. The implications of this are that a receiver, when operating in non-deal conditions, such as fading or high-dynamics, may struggle to converge to the correct stable lock point, resulting in biased range measurements.

US2014119392A discloses a receiver for receiving a composite signal transmitted from a satellite, such as a navigation satellite (e.g., a multiplexed binary offset carrier signal or pilot component of the L1C signal for the Global Positioning System (GPS)) the receiver being capable of at least partially decoding the received composite signal that is received. In one embodiment, the received composite signal is from a Galileo-compatible navigation satellite or Global Positioning System satellite. In one embodiment, the received composite signal refers to a first binary offset carrier signal that is multiplexed with a second binary offset carrier signal.

EP2402787A1 discloses a GNSS receiver that can perform correlation processing on a positioning signal phase-modulated by a CBOC signal. A correlation processing module performs correlation processing between a baseband signal and a BOC(1, 1) replica code to output a BOC(1, 1) correlation data, and also performs correlation processing between the baseband signal and a BOC(6, 1) replica code to output a BOC(6, 1) correlation data.

SUMMARY OF THE INVENTION

In one aspect of the invention there is provided a method of processing offset carrier modulated (OCM) ranging signals in a radionavigation system comprising a plurality of satellite-borne transmitters and at least one ground-based receiver, the receiver being adapted to carry out the method, the method comprising: receiving a first radionavigation signal from at least one of the plurality of transmitters and deriving therefrom a first OCM signal $S_A$; receiving a second signal $S_B$ synchronously broadcast with the first OCM signal $S_A$, the second signal $S_B$ having the same or nearby center frequency to the first OCM signal $S_A$; generating a combined correlation value $Y_C$, the combined correlation value $Y_C$ corresponding to the correlation of a combined signal $S_C$ with a replica of the first OCM signal, the combined signal $S_C$ resulting from the coherent combination at the receiver of first OCM signal $S_A$ with the second signal $S_B$; and deriving ranging information based on the combined correlation value $Y_C$.

In one embodiment, the center frequency of the second signal $S_B$ is selected such that the power spectral density (PSD) of the second signal $S_B$ occupies the bandwidth contained between two lobes of the first OCM signal $S_A$. The second signal $S_B$ may have (i) no subcarrier or (ii) a subcarrier $SC_B$, the subcarrier $SC_B$ being of lower frequency than a subcarrier $SC_A$ of the first signal $S_A$. The subcarrier $SC_B$ of the second signal $S_B$ may be a square wave.

In one embodiment, the center frequencies of the first OCM signal $S_A$ and the second signal $S_B$ differ by no more than the sum of the sub-carriers of the first OCM signal $S_A$ and the second signal.

In one embodiment, the center frequencies of the first OCM signal $S_A$ and the second signal $S_B$ satisfy $$|F_C^A - F_C^B| \leq F_S^A + F_S^B$$

where the first OCM signal $S_A$ and the second signal $S_B$ have center frequencies $F_C^A$ and $F_C^B$, respectively, and have sub-carrier frequencies $F_S^A$ and $F_S^B$, respectively.

In one embodiment, the center frequencies of the first OCM signal $S_A$ and the second signal $S_B$ satisfy $$|F_C^A - F_C^B| \leq \min(F_S^A, F_S^B)$$

where the first OCM signal $S_A$ and the second signal $S_B$ have center frequencies respectively, and have sub-carrier frequencies $F_S^A$ and $F_S^B$, respectively.

The second signal $S_B$ may be synchronously broadcast with the first OCM signal $S_A$.

The second signal $S_B$ may comprise one of (i) an OCM signal and (ii) a BOC signal.

In one embodiment, generating a combined correlation value $Y_C$ comprises: coherently combining the first OCM signal $S_A$ with the second signal $S_B$ according to $$s_C(t) = s_A(t) + s_B(t); \text{ and:}$$

generating, using a combined integrate and dump function, the combined correlation value $Y_C$ from $s_C(t)$ and the replica signal.

In one embodiment, generating a combined correlation value $Y_C$ comprises:

generating, using a first integrate and dump function, a first correlation value $Y_A$ from the first OCM signal $s_A(t)$ and the replica signal according to $$Y_A(f, \tau, \theta) = \frac{1}{T_I} \int_t^{t+T_I} s_A(t) \exp(-j(2\pi f t + \theta)) C_A(t+\tau) SC_A(t+\tau) dt,;$$

where $C_A(t)$ is the CDMA spreading sequence, and $SC_A(t)$ is the sub-carrier, of the first OCM signal $S_A$;

generating, using a second integrate and dump function, a second correlation value $Y_B$ from $s_B(t)$ and the replica signal according to $$Y_B(f, \tau, \theta) = \frac{1}{T_I} \int_t^{t+T_I} s_B(t) \exp(-j(2\pi f t + \theta)) C_B(t+\tau) SC_B(t+\tau) dt,$$

where $C_B(t)$ is the CDMA spreading sequence, and $SC_B(t)$ is the sub-carrier, of the second signal $S_B$; and coherently combining the first correlation value $Y_A$ and the second correlation value $Y_B$ to form the combined correlation value $Y_C$. The subcarrier $SC_A$ of the first signal $S_A$, and/or the subcarrier $SC_B$ of the second signal $S_B$, may be a square wave.

In one embodiment, generating a combined correlation value $Y_C$ comprises generating $Y_C$ as the weighted sum $$Y_C = k_A Y_A + k_B Y_B,$$

where $Y_A$ and $Y_B$ are correlation values derived from the first OCM signal $S_A$ and the second signal $S_B$, respectively, and $k_A$ and $k_B$ are weighting factors.

Generating a combined correlation value $Y_C$ may comprise generating $Y_C$ according to $$Y_C(f, \tau, \theta) = \frac{1}{T_I} \int_t^{t+T_I} s_A(t) k_A \exp(-j(2\pi f t + \theta)) C_A(t+\tau) SC_A(t+\tau) dt$$
$$+ \frac{1}{T_I} \int_t^{t+T_I} s_B(t) k_B \exp(-j(2\pi f t + \theta)) C_B(t+\tau) SC_B(t+\tau) dt$$
$$= k_A Y_A(f, \tau, \theta) + k_B Y_B(f, \tau, \theta)$$

where $C_A(t)$ is the CDMA spreading sequence, and $SC_A(t)$ is the sub-carrier, of the first OCM signal $S_A$;

where $C_B(t)$ is the CDMA spreading sequence, and $SC_B(t)$ is the sub-carrier, of the second signal $S_B$; and where $k_A$ and $k_B$ are weighting factors and $k_A + k_B = 1$. In one embodiment, $k_A = k_B$. The subcarrier $SC_A$ of the first signal $S_A$, and/or the subcarrier $SC_B$ of the second signal $S_B$, may be a square wave.

The method may further comprise providing a module for generating, based on the combined correlation value $Y_C$, a code-delay error function; wherein the ratio $k_A:k_B$ is selected such that a plot of the code-delay error function has only one positive slope zero-crossing.

The method may further comprise: operating the receiver in a first mode for a first period in which the ratio $k_A:k_B$ is varied until a condition is satisfied that a plot of the code-delay error function, determined based on the combined correlation value $Y_C$, has only one positive slope zero-crossing; and operating the receiver in a second mode after the condition is satisfied, in which the ratio $k_A:k_B$ has a predetermined value. Preferably, the predetermined value is in a range defined by $k_A = k_B$ to $k_A \gg k_B$.

In one embodiment, the ratio $k_A:k_B$ is continuously varied in response to environmental factors, signal strength factors, and/or user dynamics factors.

According to another aspect, there is provided a receiver for processing offset carrier modulated (OCM) ranging signals in a radionavigation system comprising a plurality of satellite-borne transmitters and at least one ground-based receiver, the receiver being comprising: an antenna for receiving a first radionavigation signal from at least one of the plurality of transmitters; and processing circuitry, coupled for receiving the first radionavigation signal, the processing circuitry being operable to perform the method of any of claims 1 to 16 of the appended claims.

According to another aspect, there is provided a recordable, rewritable or storable medium having recorded or stored thereon data defining or transformable into instructions for execution by processing circuitry and corresponding to at least the steps of any of claims 1 to 16 of the appended claims.

According to another aspect, there is provided a server computer incorporating a communications device and a memory device and being adapted for transmission on demand or otherwise of data defining or transformable into instructions for execution by processing circuitry and corresponding to at least the steps of any of claims 1 to 16 of the appended claims.

BRIEF DESCRIPTION OF THE DRAWINGS

Embodiments of the invention will now be described by way of reference example to the accompanying drawings, in which.

DETAILED DESCRIPTION OF EMBODIMENTS

In the following, like numerals will be used to denote like elements. As used herein, the "coherent combination" of two signals is a linear addition of the time-domain signals, as complex numbers, respecting the relative phasing of the signals, as broadcast by the transmitter.

As mentioned above, as many GNSS signals are broadcast from each satellite in a GNSS, it is not uncommon that the center-frequency of offset-carrier modulated signal coincides with a second signal which either has been modulated with either (a) no sub-carrier, or (b) a sub-carrier of a low frequency. The present disclosure describes a technique for processing offset-carrier modulated signals in the presence of these second signals. This technique eliminates some of the challenges experienced by receivers providing a reduction in the likelihood of side-peak acquisition and a reduced sensitivity to multipath propagation. Thus, it is not necessary that the second signal $S_B$ be modulated by a subcarrier, as the present invention will function and provide the noted improvements in performance if the second signal $S_B$ is not modulated by a subcarrier. If the second signal $S_B$ is modulated by a subcarrier, the present invention will function, however, the improvements will only be achieved if the subcarrier has a frequency lower than the frequency of the subcarrier of the first signal $S_A$.

Figure 1:
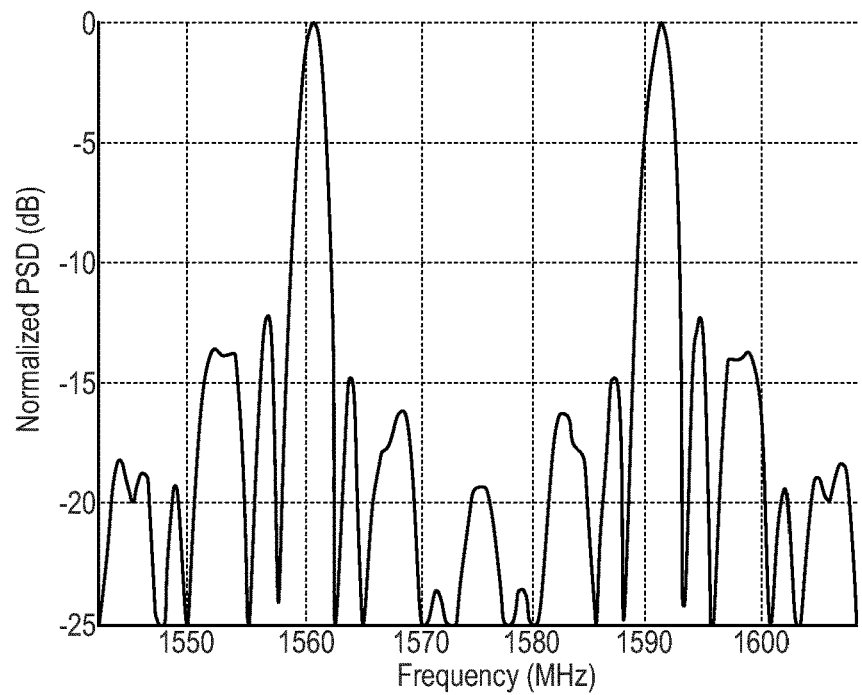
FIG. 1 (PRIOR ART) shows the normalized PSD of a $BOC_c(15, 2.5)$ signal.
Figure 2:
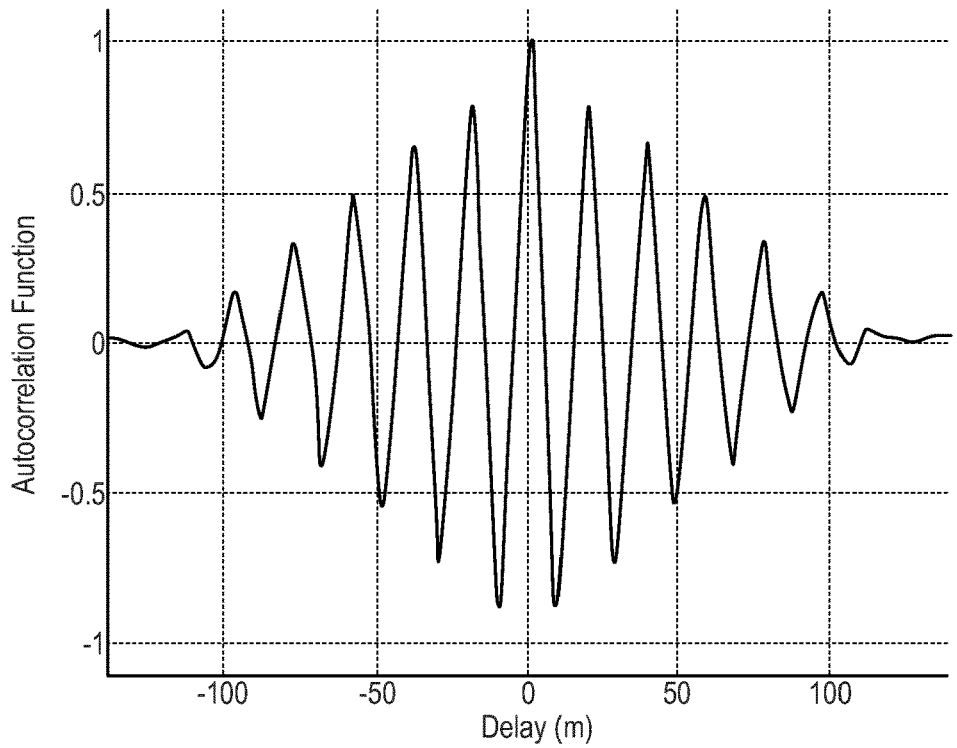
FIG. 2 (PRIOR ART) shows the normalized autocorrelation function $Y_A$ of a $BOC_C(15, 2.5)$ signal.
Figure 3:
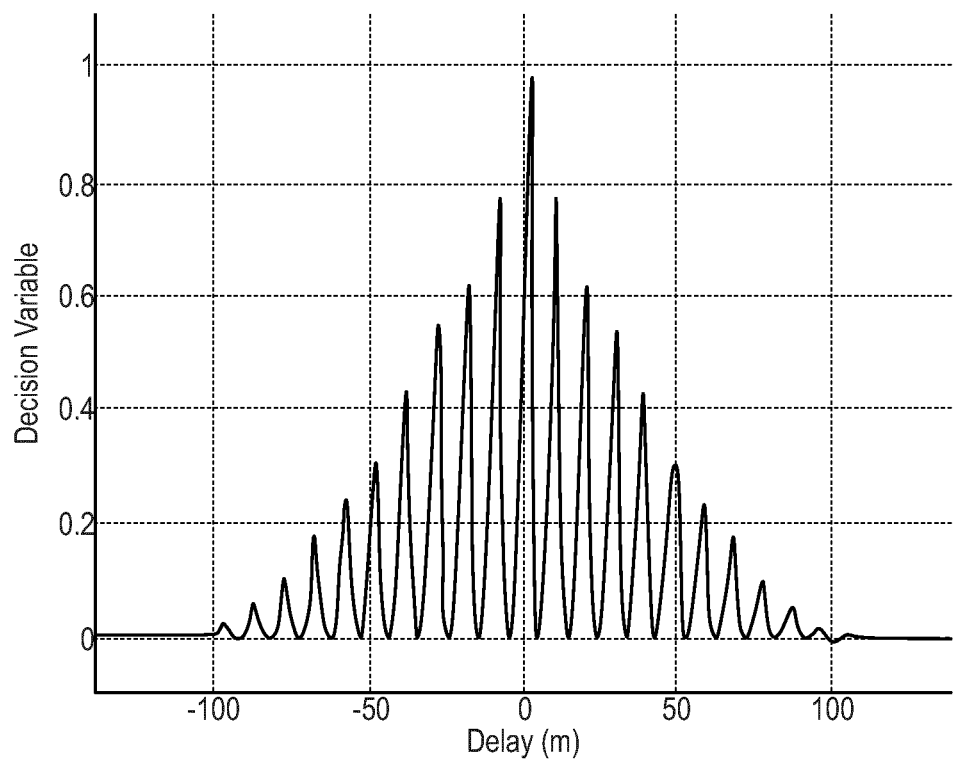
FIG. 3 (PRIOR ART) shows the normalized non-coherent decision variable $(|YA|^2)$ of a $BOC_C(15, 2.5)$ signal.
Figure 4:
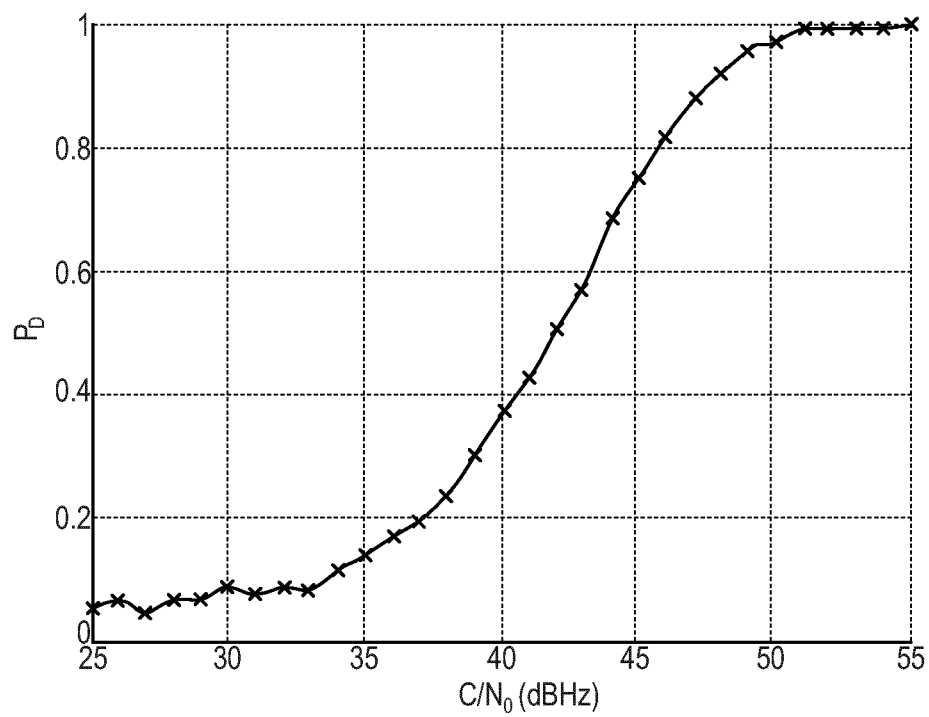
FIG. 4 (PRIOR ART) shows the probability of selecting the correct code delay for a $BOCc(15, 2.5)$ signal, given code-delay values in the range ±30 meters at a 1 meter spacing and coherent integration period of 1 ms.
Figure 5:
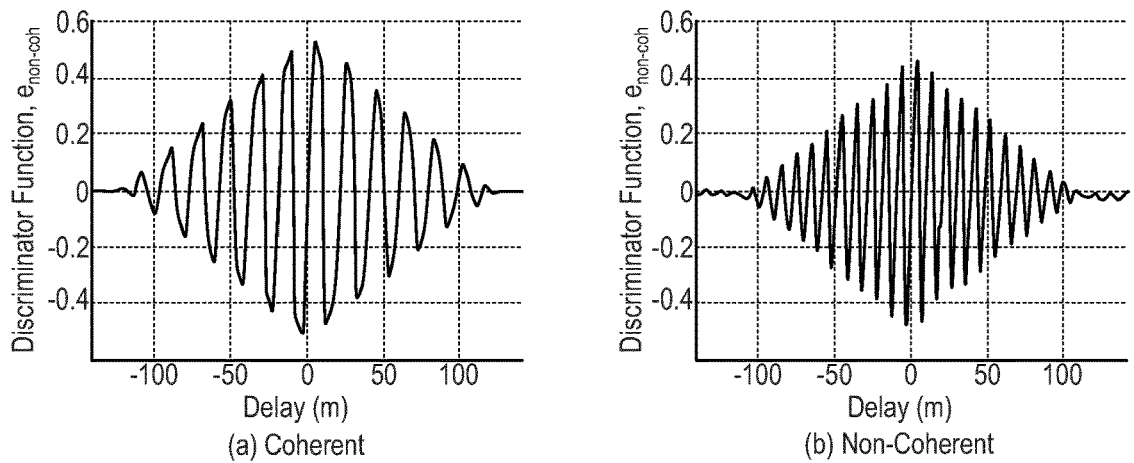
FIG. 5 (PRIOR ART) depicts (a) the coherent code error estimate, and (b) the non-coherent code error estimate, of a BOCc(15, 2.5) signal given an early-to-late correlator spacing of 5 m.
Figure 6:
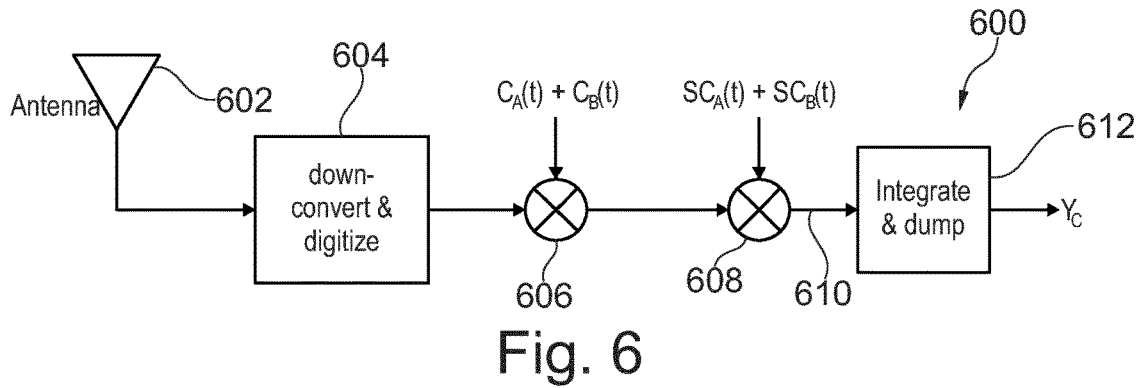
FIG. 6 is a schematic block diagram of a receiver according to an embodiment of the invention, illustrating the combined processing of two signals, $s_A$ (t) and $s_B$ (t) as one coherent signal, $s_C$ (t)

FIG. 6 is a schematic block diagram of a receiver 600 according to an embodiment of the invention, illustrating the combined processing of two signals, $s_A$ (t) and $s_B$ (t) as one coherent signal, $s_C$ (t).

In an embodiment, the second signal, $s_B(t)$, is broadcast on the same center frequency as $s_A(t)$. In the present embodiment, another BOC modulation is used as the second signal, $s_B(t)$, although in principle any modulation type could be used for the second signal $s_B(t)$.

Thus, in the present embodiment, the second signal $s_B(t)$ comprises a $BOCs_C(1, 1)$, having the following signal model:

$$s_B(t) = \sqrt{2P_B} \cos(2\pi F_A t + \theta_B) C_B(t) SC_B(t), \quad (7)$$

where the notation is analogous to that of (1). In the present embodiment, both $s_A$ and $s_B$ are centered at $F_A$. Advantageously, the present embodiment is based on the receiver processing a single combined signal, following:

$$s_C(t) = s_A(t) + s_B(t) \quad (8)$$

As seen in FIG. 6, antenna 602 receives radionavigation signal which is supplied to downconverting and digitizing module 604 which outputs a digitized (sampled) signal $s_A(t)$. As schematically illustrated, $s_A(t)$ and $s_B(t)$ are effectively coherently combined, whereby a first component $C_B(t)$ of second signal $s_B(t)$ is combined with CDMA spreading sequence component $C_A(t)$ of first signal $s_A$ (t) at first mixer 606, and a second component $SC_B(t)$ of second signal $s_B(t)$ is combined with square wave subcarrier $SC_A(t)$ of first signal $s_A(t)$ at second mixer 608. The resulting coherently combined signal 610 is fed to first integrate and dump module 612, at which the correlation with a local replica signal is performed, to derive the correlator value $Y_C$ of the combined signal sat). In embodiments, the signals $S_A$ and $S_B$ are separate and different, most notably in that they may use a different CDMA spreading code, such that $C_A$ and $C_B$ are different. In embodiments, in the present invention two genuinely different signals are used, which may have two different carriers, two different spreading codes, and/or two different data modulations (if they are present).

Following (2), the correlator values $Y_C$ computed for this combined signal are generated via:

$$Y_C(f, \tau, \theta) = \frac{1}{T_I} \int_t^{t+T_I} s_A(t) k_A \exp(-j(2\pi f t + \theta)) C_A(t+\tau) SC_A(t+\tau) dt \quad (9)$$

$$+ \frac{1}{T_I} \int_t^{t+T_I} s_B(t) k_B \exp(-j(2\pi f t + \theta)) C_B(t+\tau) SC_B(t+\tau) dt \quad (10)$$

$$= k_A Y_A(f, \tau, \theta) + k_B Y_B(f, \tau, \theta) \quad (11)$$

where $k_A$ and $k_B$ are weighting factors, $k_A + k_B = 1$, and $$Y_B(f, \tau, \theta) = \frac{1}{T_I} \int_t^{t+T_I} s_B(t) \exp(-j(2\pi f t + \theta)) C_B(t+\tau) SC_B(t+\tau) dt, \quad (13)$$

as depicted in FIG. 6. Thus, signal component $S_A(t)$ is correlated with components $C_A$ and $SC_A$, while the signal component $S_B(t)$ is correlated with components $C_B$ and $SC_B$.

For simplicity and for purposes of illustration, in the present embodiment, the nominal received power for $s_A(t)$ and $s_B(t)$, i.e. $P_A$ and $P_B$, are equal; however, this need not necessarily be the case. Also, in the present embodiment, $k_A = k_B$. Cases where $k_A \neq k_B$ are discussed later in this disclosure.

The inventors have discovered that an improvement over the receiver processing performance over the techniques shown in FIGS. 1 to 5 can be attained by combining the received OCM signal with another signal that has the same, or nearby center frequency.

In one embodiment, the PSD of the second signal occupies the bandwidth contained between the two lobes of the PSD of the OCM signals. This generally implies that the center frequencies of the two signals should differ by no more than the sum of the sub-carriers of the two signals. For example, if the (PSDs of) signals A and B have center frequencies $F_C^A$ and $F_C^B$, respectively, and those signals have sub-carrier frequencies $F_S^A$ and $F_S^B$, respectively, then the most pronounced improvements are achieved when $$|F_C^A - F_C^B| \leq \min(F_S^A, F_S^B), \quad (5)$$

however, the techniques according to embodiments of the invention still provide a significant improvement when the following, less restrictive, condition is satisfied:

$$|F_C^A - F_C^B| \leq F_S^A + F_S^B, \quad (6)$$

It is to be noted, however, that the requirements presented in (5) and (6) represent conditions which provide optimal or near optimal performance, but do not represent absolute or mandatory requirements. To demonstrate these potential improvements, another example is discussed in the following.

Figure 7:
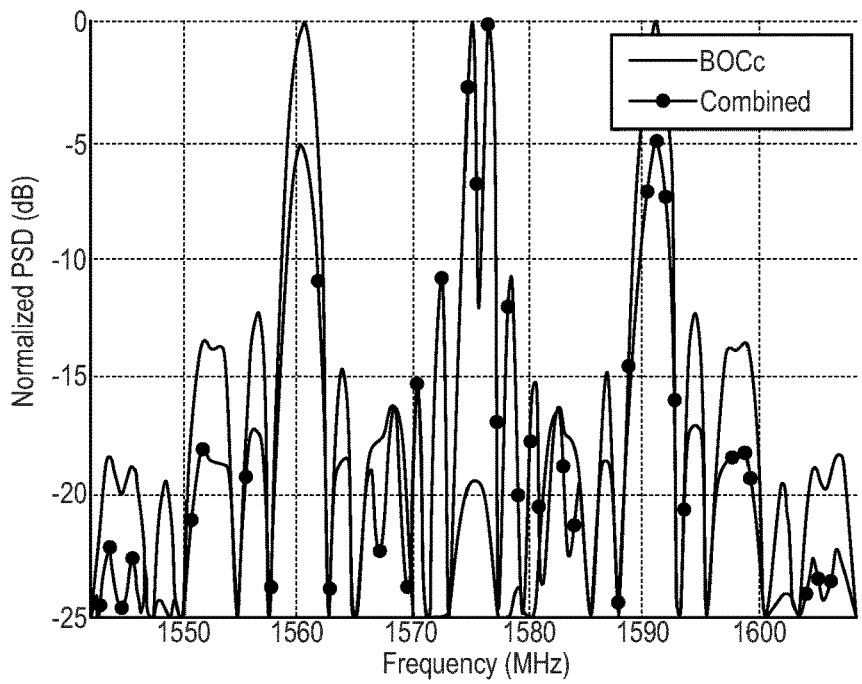
FIG. 7 shows the normalized PSD of the combined signal $s_C(t)$ formed by the coherently combination of a BOCc(15, 2.5) signal and a concentric BOCs(1,1) signal.

FIG. 7 shows the normalized PSD of the combined signal $s_C(t)$ formed by the coherently combination of a BOCc(15, 2.5) signal ($s_A$) and a concentric BOCs(1,1) signal ($s_B$), along with that for the signal $s_A$. It is to be noted that the addition of the second signal concentrates a significant amount of power near the signal center frequency.

Figure 8:
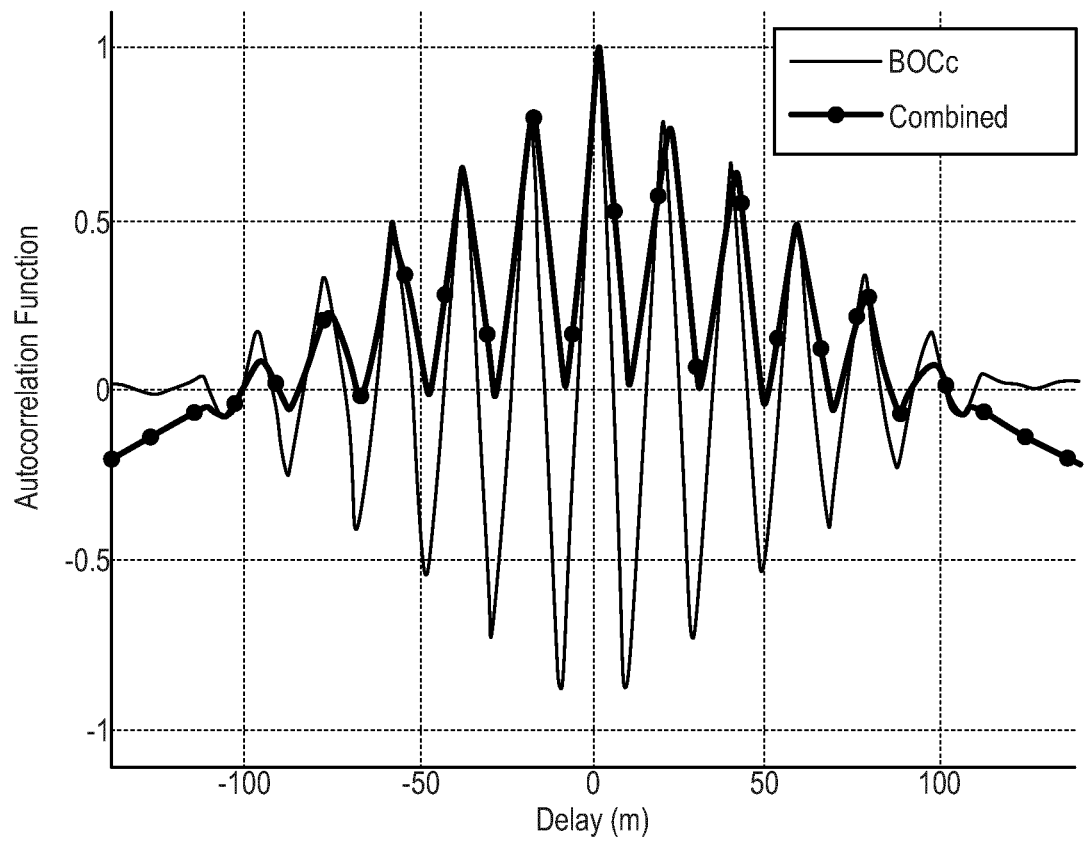
FIG. 8 shows the normalized autocorrelation function $Y_C$ the combined signal $s_C(t)$.

FIG. 8 shows the normalized autocorrelation function $Y_C$ the combined signal $s_C(t)$, along with that for the signal $s_A$. It is apparent that, as a result of the use of the combination, that the signal autocorrelation function, $Y_C$, has a positive bias and has excursions below zero of lower magnitude than that of $s_A$.

Figure 9:
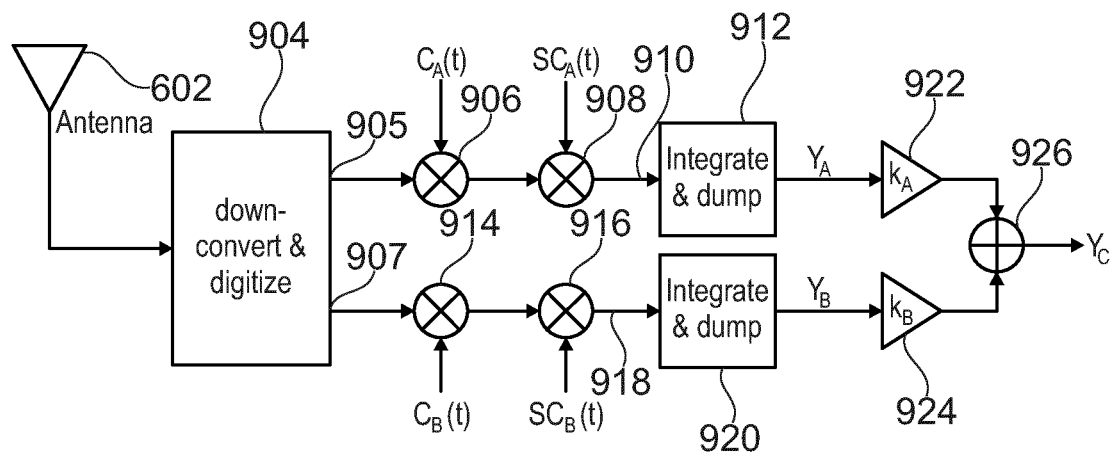
FIG. 9 is a schematic block diagram of a receiver according to another embodiment of the invention, illustrating the combined processing of two signals, $s_A$ (t) and $s_B$ (t) via the weighted linear addition of the corresponding correlator values $Y_A$ and $Y_B$.

FIG. 9 is a schematic block diagram of a receiver according to another embodiment of the invention, illustrating the combined processing of two signals, $s_A(t)$ and $s_B(t)$ via the weighted linear addition of the corresponding correlator values $Y_A$ and $Y_B$. It is to be noted that, as the correlation process is linear, the combination of the two signal components can also be done after the correlation operation, according to the alternative combination method depicted in FIG. 9.

More particularly, antenna 602 receives radionavigation signal which is supplied to downconverting and digitizing module 904, which outputs a digitized (sampled) signal $s_A(t)$ at 905, as well as $s_B(t)$ at 907. As schematically illustrated, $s_A(t)$ is effectively combined with CDMA spreading sequence component $C_A(t)$ of first signal $s_A(t)$ at third mixer 906, and is combined with square wave subcarrier $SC_A(t)$ of first signal $s_A(t)$ at fourth mixer 908. The resulting combined signal 910 is fed to second integrate and dump module 912, at which the correlation with a local replica signal is performed, to derive the first correlator value $Y_A$ of the first signal $s_A(t)$.

As schematically illustrated, $s_B(t)$ is effectively combined with a first component $C_B(t)$ of second signal $s_B(t)$ at fifth mixer 914, and is combined with square wave subcarrier $SC_B(t)$ of first signal $s_B(t)$ at sixth mixer 916. The resulting combined signal 918 is fed to third integrate and dump module 920, at which the correlation with a local replica signal is performed, to derive the correlator value $Y_B$ of the second signal $s_B(t)$.

Next, at first correlator value $Y_A$ is multiplied by first weighting factor $k_A$ at first amplifier 922, and second correlator value $Y_B$ is multiplied by second weighting factor $k_B$ at second amplifier 924.

Finally, the weighted outputs, $k_A Y_A$ and are $k_B Y_B$ coherently combined at combiner 926, producing combined correlator value $Y_C$.

Figure 10:
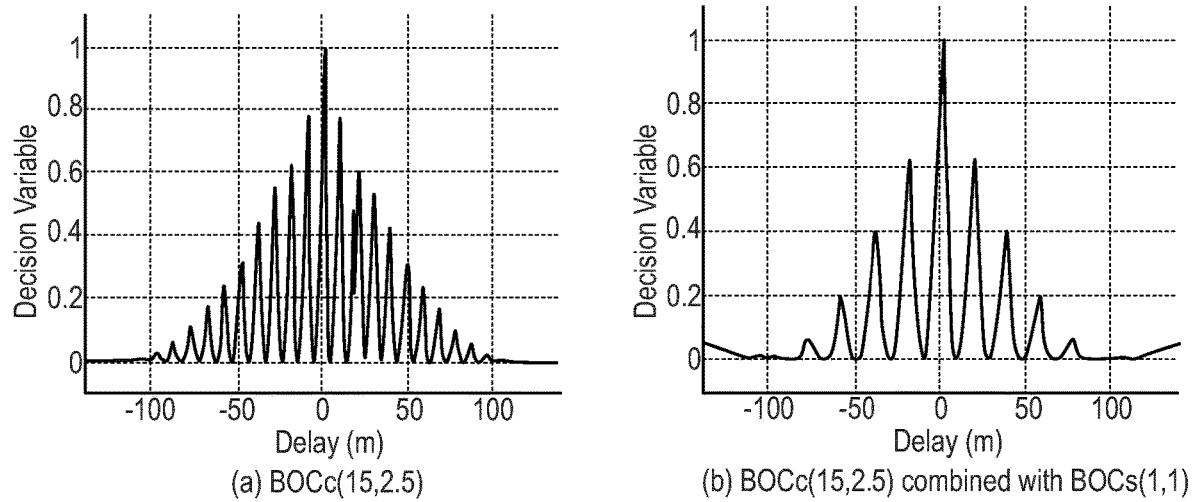
FIG. 10 shows the normalized non-coherent decision variable $|Y_C|^2$ of the combined signal $s_C(t)$.

FIG. 10 shows (a) the normalized non-coherent decision variable $|Y_A|^2$ of the first signal $s_A(t)$ (BOCc(15,2.5)), and (b) the normalized non-coherent decision variable $|Y_C|^2$ of the combined signal $s_C(t)$ (coherently combined BOCc(15, 2.5) signal and a concentric BOCs(1,1) signal). This illustrates the advantageous reduction in acquisition ambiguity, according to embodiments of the invention.

Although the autocorrelation function $Y_C$ of the combined signal $s_C(t)$ is similar in complexity and number of vertices, to that of the $BOC_c(15, 2.5)$ signal $s_A(t)$, the positive bias and lack of large negative excursions means that the square magnitude of the autocorrelation function is quite different. As is apparent from FIG. 10, wherein the square magnitudes of each of the autocorrelation functions $|Y_A|^2$ and $|Y_C|^2$ are depicted, the combined signal $s_C(t)$ results in a function which has far fewer local maxima, reducing in acquisition ambiguity.

Reference is made again to the problems mentioned hereinabove—that the signal has been acquired by detecting and tracking each of its components parts, the upper, lower and now central lobes, separately. Given this coarse acquisition estimate, a receiver may begin to track the individual signals to refine the delay and frequency alignment and, subsequently, attempt a fine acquisition of the composite signal, $s_C$.

Figure 11:
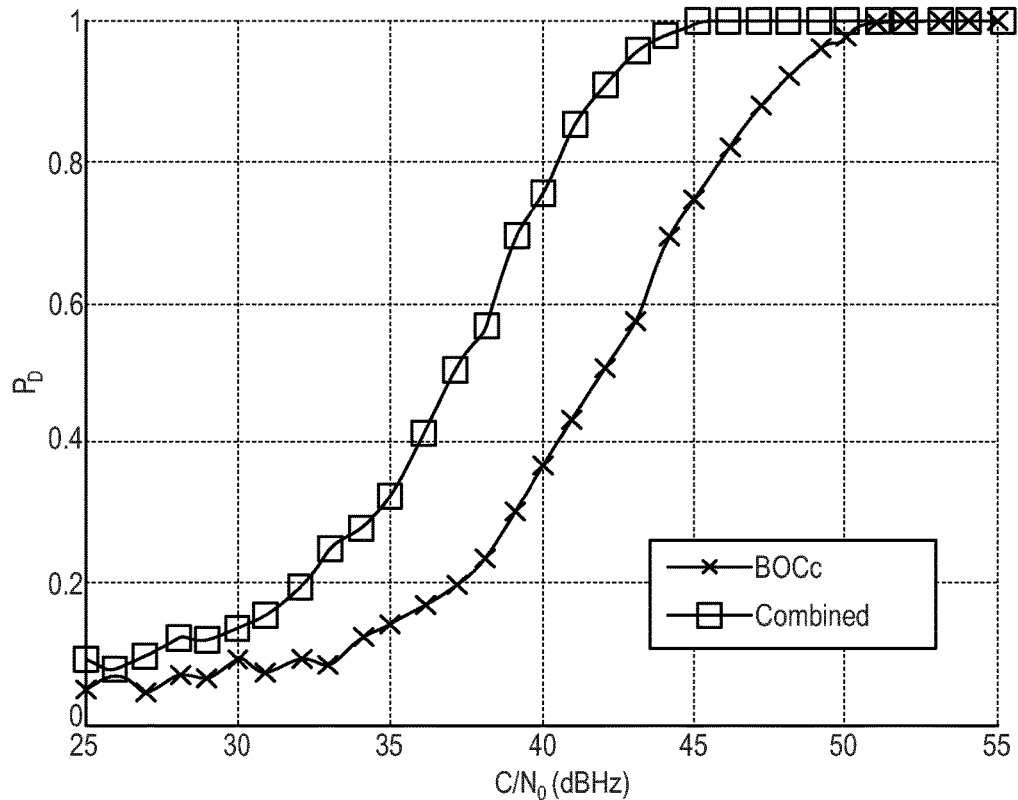
FIG. 11 is a plot showing probability of selecting the correct code delay for each of the first signal, $s_A(t)$, and the combined signal, $s_C(t)$, given code-delay values in the range ±30 meters at a 1 meter spacing and coherent integration period of 1 ms.

FIG. 11 is a plot showing probability of selecting the correct code delay for combined signal, $s_C(t)$, given code-delay values in the range ±30 meters at a 1 meter spacing and coherent integration period of 1 m, for a selection of received $C/N_0$ values. Included also, for comparison, are the results for the BOCc(15, 2.5)-only case ($s_A(t)$).

It is worth nothing that two factors are involved. Firstly, the inclusion of the second signal component, $s_B$ increases the received signal power by a factor of two, assuming that $P_A = P_B$. Thus, it is reasonable to assume that the detection probability curves should be similar in shape, but that that of the combined signal should be shifted by approximately 3 dB. The second factor is that there are far fewer local maxima (in $Y_C$) in the combined case, in this embodiment, approximately half as many. For this reason, the receiver is significantly less likely to mistakenly designate a local maxima as the global maximum.

The plots in FIG. 11 demonstrate the improvement that can be achieved by combining both signals coherently. Indeed, in some cases the improvement is of the order of 5 dB. Advantageously, as the locations of the local maxima are further from the global maximum, appropriate weighting of $|Y_C|^2$ (selection of $k_A$ and $k_B$) based on an a priori error distribution yields more improvement in the combined case than in the case of the BOCc(15, 2.5) signal alone.

Embodiments of the inventions also provide reduced tracking ambiguity. In embodiments, the method of processing the first signal $s_A(t)$ (BOCc(15, 2.5)) by coherently combining it with a concentric second signal $s_B(t)$ (BOCs(1, 1)) can also provide some improvements in the code-delay tracking performance. As with acquisition ambiguity, the reduced complexity of the square magnitude of the autocorrelation function contributes to this improvement.

Figure 12:
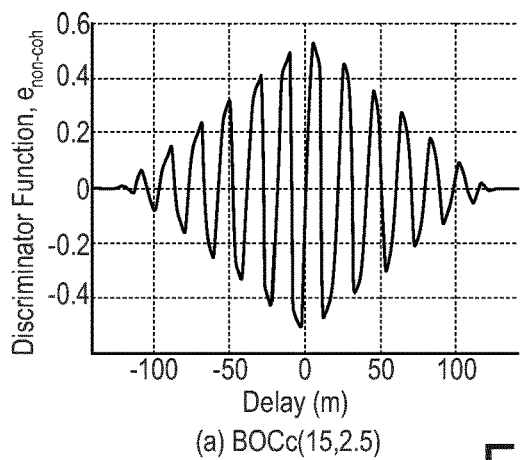
FIG. 12 shows the coherent code error estimate of (a) the BOCc(15, 2.5) signal and (b) the combined signal $s_C(t)$, given an early-to-late correlator spacing of 5 meters.
Figure 12:
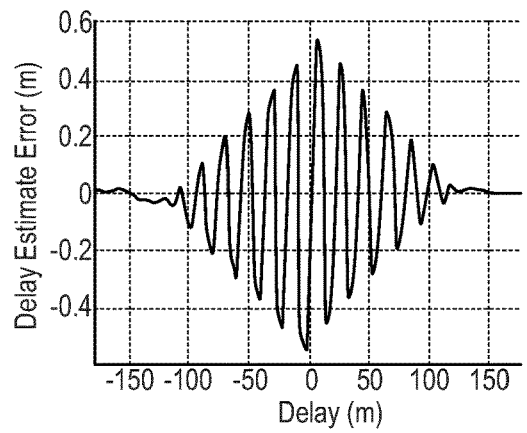
Figure 13:
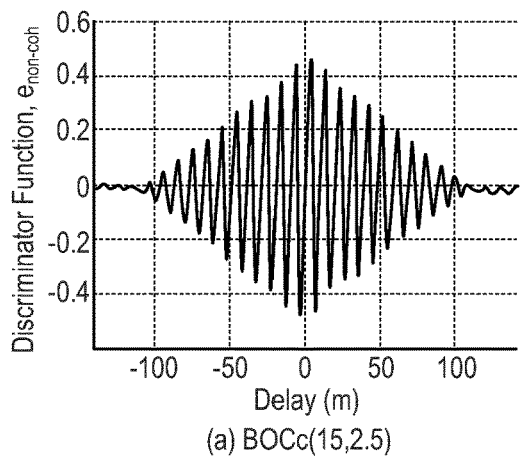
FIG. 13 shows the non-coherent code error estimate of (a) the BOCc(15, 2.5) signal and (b) the combined signal $s_C(t)$, given an early-to-late correlator spacing of 5 meters.
Figure 13:
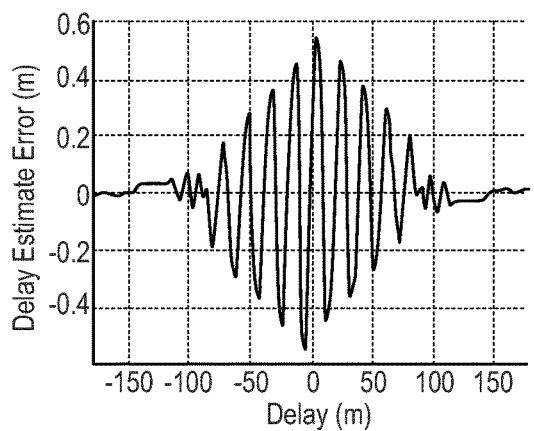

FIG. 12 shows the coherent code error estimate of (a) the BOCc(15, 2.5) signal and (b) the combined signal $s_C(t)$, given an early-to-late correlator spacing of 5 m. FIG. 13 shows the non-coherent code error estimate of (a) the BOCc(15, 2.5) signal and (b) the combined signal $s_C(t)$, given an early-to-late correlator spacing of 5 m. As can be seen in FIG. 12, the coherent discriminator when applied to the combined signal can provide similar performance to that of the traditional, BOCc(15, 2.5)-only, case. However, in the non-coherent case, the addition of the second signal, $s_B$, reduces the number of false-lock points by a factor of two, as illustrated in FIG. 13. This can significantly improve the robustness in harsh propagation environments.

Figure 14:
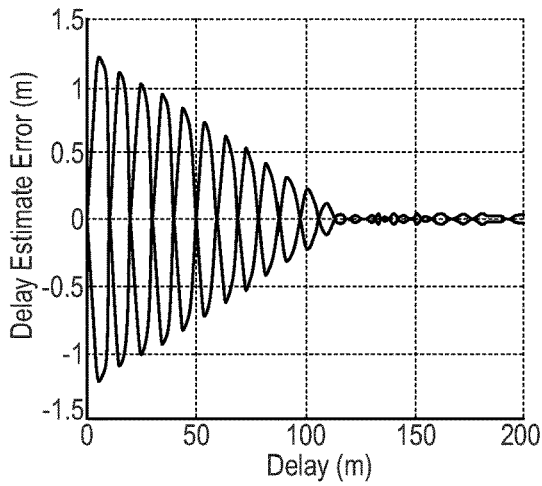
FIG. 14 shows the multipath envelope of (a) the BOCc (15, 2.5) signal and (b) the combined signal $s_C(t)$, assuming an early-to-late correlator spacing of 5 m and a signal specular reflection having a power of −6 dB relative to the line-of-sight signal.
Figure 14:
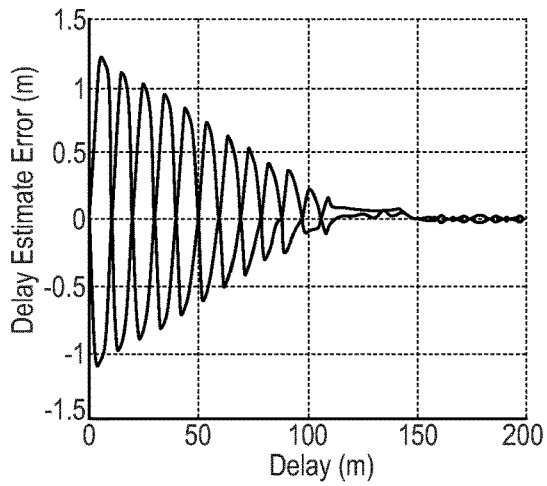

One consideration in receiver systems is the multipath envelope. FIG. 14 shows the multipath envelope of (a) the BOCc(15, 2.5) signal and (b) the combined signal $s_C(t)$, assuming an early-to-late correlator spacing of 5 m and a signal specular reflection having a power of −6 dB relative to the line-of-sight signal.

In embodiments, despite changing the characteristics of the code-delay estimator, the performance of the combined signal $s_C(t)$ is similar to that of the BOCc(15, 2.5) ($s_A(t)$) when processed alone. One common way of assessing the sensitivity of a ranging signal to multipath propagation is to examine its, so-called, multipath envelope. Here, a single specular multipath reflection is considered. It is assumed that it arrives at the receiver with a power equal to one quarter (−6 dB) of that of the line-of sight signal. A range of relative delays of the multipath signal are considered, and the largest excursions of the central zero-crossing of code-delay estimate is found. FIG. 14 depicts this multipath envelope for both the BOCc(15, 2.5) signal ($s_A(t)$) and the combined processing of BOCc(15, 2.5) signal and a concentric BOCs(1, 1) signal ($s_C(t)$), wherein it can be seen that the multipath envelopes are almost identical in shape and magnitude.

Advantageous embodiments of the type of signal combining discussed above enable a user to define the signal correlation properties. As indicated in (11), the combined correlator value ($Y_C$) is formed as the weighted sum of the correlation ($k_A Y_A + k_B Y_B$) of each of the signal components, $s_A$ and $s_B$. By manipulating the weighting factors ($k_A, k_B$) the user can achieve a variety of different correlation properties. These can be exploited both in the acquisition and the tracking stages. Briefly, they can be summarized as follows.

Figure 15:
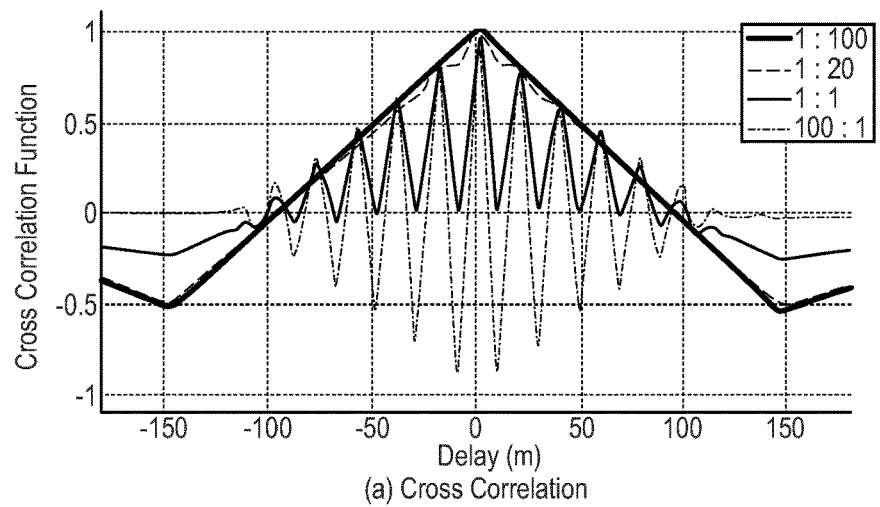
FIG. 15 shows (a) cross correlation, (b) acquisition decision variable, and (c) code-delay estimate of the combined signal $s_C(t)$ for signal weighting ratios $\{k_A, k_B\}$ at each of 1:100, 1:20, 1:1 and 100:1.
Figure 15:
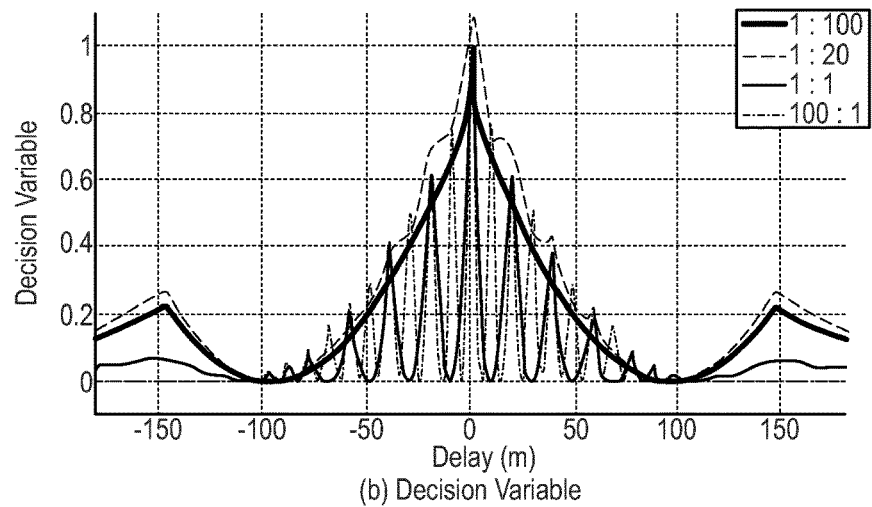
Figure 15:
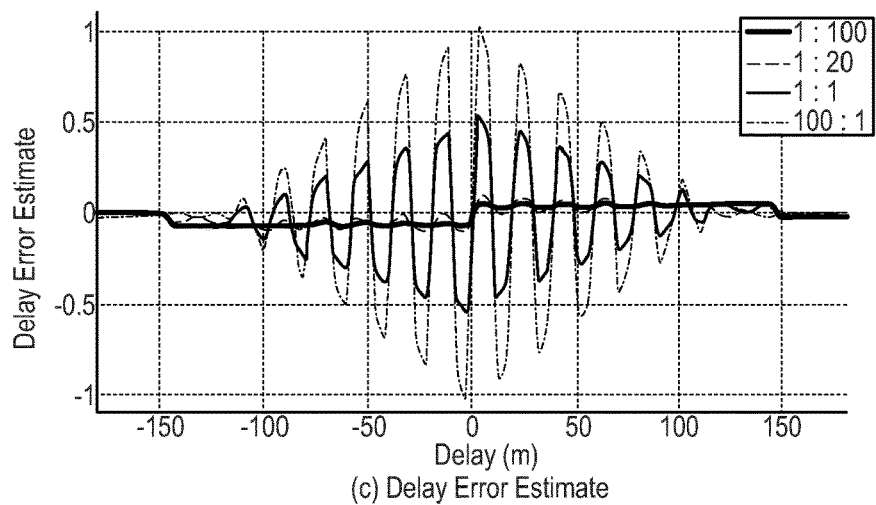

FIG. 15 shows (a) cross correlation, (b) acquisition decision variable, and (c) code-delay estimate of the combined signal $s_C(t)$ for signal weighting ratios $\{k_A, k_B\}$ at each of 1:100, 1:20, 1:1 and 100:1. The autocorrelation function can be manipulated, as depicted in FIG. 15(a), to be that of either signal component, or anything in between. In this case, it corresponds to approximately that of a BOCs(1, 1) signal for a ratio $\{k_A:k_B\}=\{1:100\}$, through various forms that resemble a Composite Binary Offset Carrier (CBOC) modulation, to finally assuming approximately that of a BOCs(15, 2.5) signal for a ratio $\{k_A:k_B\}=\{100:1\}$. These various weightings can be leveraged in the acquisition stage, where the cases of $k_B \geq k_A$ have fewer local maxima, as depicted in FIG. 15(b), thereby reducing the likelihood of side-peak acquisition.

In embodiments, in the tracking domain also, it is possible to exploit the above technique to produce various modulation properties, depending on the application. It may be desirable for the user to avail themselves of the low ambiguity of the BOCs(1, 1) component, under certain circumstances, while the high precision offered by the BOCs(15, 2.5) may be desirable in others. Embodiments allow a user to vary of select a particular weighting configuration.

Embodiments also provide a method of finding the stable lock point that corresponds to the true signal delay. In one embodiment, by selecting certain weighting options, it is possible to ensure that the code-delay error function has only one positive slope zero-crossing. In the particular embodiment chosen here, this corresponds to the case of $k_B \geq 20 k_A$, as depicted in FIG. 15(c). In addition, in one embodiment, once the appropriate zero-crossing has been identified, the ratio can be reduced to unity, or beyond that to that of the BOCs(15, 2.5) signal alone.

In embodiments, continuously adaptive variation of the factors $\{k_A, k_B\}$ in response to factors such as environment, signal strength, and user dynamics may be performed (e.g. by the user), both in the acquisition and tracking phases.

In summary, there is presented herein, at least in embodiments, a novel method of processing an OCM signal as part of a coherent combination another synchronously broadcast signal having a nearby center frequency. The technique provides a number of benefits to a user, including: (i) reduced acquisition ambiguity; (ii) reduced likelihood of false code-lock; (iii) improved sensitivity; and (iv) user-side tuning of the signal correlation properties. An example embodiment has been presented including a BOCc(15, 2.5) signal and a concentric BOCs(1, 1) signal, and the particular results, and corresponding receiver parameters provided, are specific to that embodiment. However, the concept of coherently combining multiple signals in such a manner can, of course, be extended to any selection of two or more appropriate signals.

While embodiments have been described by reference to embodiments having various components in their respective implementations, it will be appreciated that other embodiments make use of other combinations and permutations of these and other components.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details.

Thus, while there has been described what are believed to be the preferred embodiments of the invention, those skilled in the art will recognize that other and further modifications may be made thereto without departing from the scope of the invention.

The invention claimed is:

1. A method of processing offset carrier modulated, OCM, ranging signals in a radionavigation system comprising a plurality of satellite-borne transmitters and at least one ground-based receiver, a receiver of the at least one ground-based receiver being adapted to carry out the method, the method comprising:

receiving a first radionavigation signal from at least one of the plurality of satellite-borne transmitters and downconverting and digitizing the first radionavigation signal to derive therefrom a first offset carrier modulation (OCM) signal $S_A$;
receiving a second signal $S_B$ synchronously broadcast with the first OCM signal $S_A$, the second signal $S_B$ having the same or substantially the same center frequency as the first OCM signal $S_A$;
coherently combining the first OCM signal $S_A$ with the second signal $S_B$ at the receiver to generate a combined signal $S_C$;
generating a combined correlation value $Y_C$ corresponding to a correlation of the combined signal $S_C$ with a local replica of the first OCM signal $S_A$; and
deriving ranging information based on the combined correlation value $Y_C$.

2. The method of claim 1, wherein a center frequency of the second signal $S_B$ is such that a power spectral density (PSD) of the second signal $S_B$ occupies a bandwidth contained between two lobes of the first OCM signal $S_A$.

3. The method of claim 1, wherein the second signal $S_B$ has (i) no subcarrier or (ii) a subcarrier $SC_B$, the subcarrier $SC_B$ being of lower frequency than a subcarrier $SC_A$ of the first OCM signal $S_A$.

4. The method of claim 3, wherein center frequencies of the first OCM signal $S_A$ and the second signal $S_B$ satisfy $$|F_C^A - F_C^B| \leq F_S^A + F_S^B$$

where the first OCM signal $S_A$ and the second signal $S_B$ have center frequencies $F_C^A$ and $F_C^B$, respectively, and have sub-carrier frequencies $F_S^A$ and $F_S^B$, respectively.

5. The method of claim 3, wherein center frequencies of the first OCM signal $S_A$ and the second signal $S_B$ satisfy $$|F_C^A - F_C^B| \leq \min(F_S^A, F_S^B)$$

where the first OCM signal $S_A$ and the second signal $S_B$ have center frequencies $F_C^A$ and $F_C^B$, respectively, and have sub-carrier frequencies $F_S^A$ and $F_S^B$, respectively.

6. The method of claim 1, wherein the second signal SB comprises one of: (i) an OCM signal and (ii) a binary offset carrier (BOC) signal.

7. The method of claim 1, wherein generating the combined correlation value $Y_C$ comprises:
coherently combining the first OCM signal $S_A$ with the second signal $S_B$ according to $$s_C(t) = s_A(t) + s_B(t); \text{ and}$$

generating, using a combined integrate and dump function, the combined correlation value $Y_C$ from $s_C(t)$, and the local replica.

8. The method of any one of claim 1, wherein the second signal $S_B$ has a subcarrier $SC_B$, and wherein generating the combined correlation value $Y_C$ comprises:
generating, using a first integrate and dump function, a first correlation value $Y_A$ from the first OCM signal $s_A(t)$, and a first local replica for the first OCM signal according to $$Y_A(f, \tau, \theta) = \frac{1}{T_I}\int_t^{t+T_I} s_A(t)\exp(-j(2\pi f t + \theta))C_A(t+\tau)SC_A(t+\tau)\,dt,;$$

where $C_A(t)$ is a code division multiple access (CDMA) spreading sequence, and $SC_A(t)$ is a subcarrier, of the first OCM signal $S_A$;
generating, using a second integrate and dump function, a second correlation value $Y_B$ from $s_B(t)$, and a second local replica for the second signal $S_B$ according to $$Y_B(f, \tau, \theta) = \frac{1}{T_I}\int_t^{t+T_I} s_B(t)\exp(-j(2\pi f t + \theta))C_B(t+\tau)SC_B(t+\tau)\,dt,$$

where $C_B(t)$ is a CDMA spreading sequence, and $SC_B(t)$ is the subcarrier, of the second signal $S_B$; and
coherently combining the first correlation value $Y_A$ and the second correlation value $Y_B$ to form the combined correlation value $Y_C$.

9. The method of claim 1, wherein generating the combined correlation value $Y_C$ comprises generating $Y_C$ as a weighted sum $$Y_C = k_A Y_A + k_B Y_B,$$

where $Y_A$ and $Y_B$ are correlation values derived from the first OCM signal $S_A$ and the second signal $S_B$, respectively, and $k_A$ and $k_B$ are respective weighting factors.

10. The method of claim 1, wherein the second signal $S_B$ has a subcarrier $SC_B$, and wherein generating the combined correlation value $Y_C$ comprises generating $Y_C$ according to $$Y_C(f, \tau, \theta) = \frac{1}{T_I}\int_t^{t+T_I} s_A(t)k_A\exp(-j(2\pi f t + \theta))C_A(t+\tau)SC_A(t+\tau)\,dt$$
$$+ \frac{1}{T_I}\int_t^{t+T_I} s_B(t)k_B\exp(-j(2\pi f t + \theta))C_B(t+\tau)SC_B(t+\tau)\,dt$$
$$= k_A Y_A(f, \tau, \theta) + k_B Y_B(f, \tau, \theta)$$

where $C_A(t)$ is a code division multiple access (CDMA) spreading sequence, and $SC_A(t)$ is a subcarrier, of the first OCM signal $S_A$,
where $C_B(t)$ is a CDMA spreading sequence, and $SC_B(t)$ is the subcarrier, of the second signal $S_B$, and
where $k_A$ and $k_B$ are weighting factors and $k_A + k_B = 1$.

11. The method of claim 9, wherein $k_A = k_B$.

12. The method of claim 9, further comprising:
providing a module for generating, based on the combined correlation value $Y_C$, a code-delay error function, wherein a ratio $k_A : k_B$ is selected such that a plot of the code-delay error function has only one positive slope zero-crossing.

13. The method of claim 9, wherein $k_B \geq 20 k_A$.

14. The method of claim 9, further comprising:
operating the receiver in a first mode for a first period in which a ratio $k_A : k_B$ is varied until a condition is satisfied that a plot of a code-delay error function, determined based on the combined correlation value $Y_C$, has only one positive slope zero-crossing; and
operating the receiver in a second mode after the condition is satisfied, in which the ratio $k_A : k_B$ has a predetermined value.

15. The method of claim 14, wherein the predetermined value of the ratio $k_A : k_B$ is in a range defined by $k_A = k_B$ to $k_A \gg k_B$.

16. The method of claim 9, wherein a ratio $k_A : k_B$ is continuously varied in response to environmental factors, signal strength factors, and/or user dynamics factors.

17. The method of claim 1, wherein a subcarrier $SC_A$ of the first OCM signal $S_A$ is a square wave, and wherein a subcarrier $SC_B$ of the second signal $S_B$ is a square wave.

18. A receiver for processing offset carrier modulated, OCM, ranging signals in a radionavigation system comprising a plurality of satellite-borne transmitters and at least one ground-based receiver, the receiver comprising:
- an antenna configured for receiving a first radionavigation signal from at least one of the plurality of satellite-borne transmitters and a second signal $S_B$ synchronously broadcast with the first radionavigation signal, the second signal $S_B$ having the same or substantially the same center frequency as the first radionavigation signal; and
- processing circuitry coupled to the antenna and configured for performing:
  - receiving the first radionavigation signal from antenna and down-converting and digitizing the first radionavigation signal to derive therefrom a first offset carrier modulation (OCM) signal $S_A$;
  - receiving the second signal $S_B$ from the antenna, the second signal $S_B$ having the same or substantially the same center frequency as the first OCM signal $S_A$;
  - coherently combining the first OCM signal $S_A$ with the second signal $S_B$ at the receiver to generate a combined signal $S_C$;
  - generating a combined correlation value $Y_C$ corresponding to a correlation of the combined signal $S_C$ with a local replica of the first OCM signal $S_A$; and
  - deriving ranging information based on the combined correlation value $Y_C$.

19. The receiver of claim 18, wherein center frequencies of the first OCM signal $S_A$ and the second signal $S_B$ satisfy $$|F_C^A - F_C^B| \leq F_S^A + F_S^B$$

where the first OCM signal $S_A$ and the second signal $S_B$ have center frequencies $F_C^A$ and $F_C^B$, respectively, and have sub-carrier frequencies $F_S^A$ and $F_S^B$, respectively.

20. A system comprising:
- a processor; and
- a memory coupled to the processor, wherein the memory stores instructions that, when executed by the processor, cause the processor to:
  - receive a first radionavigation signal and down-converting and digitizing a first radionavigation signal to derive therefrom a first offset carrier modulation (OCM) signal $S_A$;
  - receive a second signal $S_B$ synchronously broadcast with the first OCM signal $S_A$, the second signal $S_B$ having the same or substantially the same center frequency as the first OCM signal $S_A$;
  - coherently combine the first OCM signal $S_A$ with the second signal $S_B$ at a receiver to generate a combined signal $S_C$;
  - generate a combined correlation value $Y_C$ corresponding to a correlation of the combined signal $S_C$ with a local replica of the first OCM signal $S_A$; and
  - derive ranging information based on the combined correlation value $Y_C$.

* * * * *